Patented Aug. 19, 1930

1,773,273

UNITED STATES PATENT OFFICE

ERNEST B. MILLER, OF BALTIMORE, MARYLAND, ASSIGNOR TO THE SILICA GEL CORPORATION, OF BALTIMORE, MARYLAND, A CORPORATION OF MARYLAND

METHOD OF MAKING GELS

No Drawing. Application filed March 13, 1926, Serial No. 94,620. Renewed November 1, 1929.

This invention relates to the manufacture of silica gel or other gels of a similar nature, and relates more particularly to a process for the purification of such gels while in the hydrogel state.

The primary object of the present invention is to provide an improved method of manufacture of such gels which will result in a product of better quality from raw materials of only ordinary commercial purity.

A further object is to provide a method of purifying gels by treatment with acid while in the hydrogel state.

Other objects and advantages will be apparent from the following description of the invention.

According to the present invention, the mixing of the materials and the coagulation or setting of the hydrogel are preferably accomplished in the manner described in Patent 1,297,724, granted Mar. 18, 1919. According to this patent, solutions of a soluble silicate and an acid are mixed in definite quantities and concentrations, so that the mixture will set to a hydrogel within a few hours, for example, three to five. If equal volumes of sodium silicate and hydrochloric acid solutions are to be mixed, the sodium silicate solution should have a specific gravity of from 1.15 to 1.22, preferably about 1.185, and the hydrochloric acid should be about a ten per cent solution by weight, having a specific gravity of about 1.05. The commercial water glass used has a specific gravity of about 42° Bé. and contains about 9% $Na_2O$ and about 29 to 30% $SiO_2$. This is diluted to give a solution having the specific gravity specified above. When solutions of these concentrations are mixed in equal volumes, with vigorous stirring, a clear, colloidal solution of silicic acid is first formed and no precipitation takes place, but the viscosity of the entire solution gradually increases and finally it sets to a jelly-like mass of hydrogel. Any acid or any mixture of acids may be employed in connection with the above process, although hydrochloric or sulphuric acids are preferred, and any soluble silicate or mixture of soluble silicates may be substituted for sodium silicate. All that is necessary is to regulate the concentrations and quantities so that the proper stability of the mixture is attained, or in other words, so that no precipitation will take place but the mixture will gradually set to a hydrogel. In order to accomplish this result, the mixture must be homogeneous and must be kept slightly acid in all its parts. This may be done either by adding the silicate solution to the acid solution with vigorous stirring, or by pouring the two solutions together uniformly while stirring vigorously. The final concentration of the acid in the resulting mixture should be from about 0.3 to 1.0 gram equivalents of hydrogen per liter, but a concentration of from 0.5 to 0.6 gram equivalents of hydrogen per liter is preferred.

The hydrogel is then broken into small pieces and washed with hot water at a temperature of about 70° C. for about twelve hours. If the temperature of the wash water is lower than 70° C. the duration of the washing must be prolonged. During the last hour of the washing the wash water should preferably be at a temperature of from 5° to 30° C. in order to cool the hydrogel.

The hydrogel is now soaked in strong acid, for example, sulfuric acid having a specific gravity of 60° Bé., for a period of approximately one-half to one hour. The strength of the acid will drop to about 45° Bé., in the course of an hour, due to adsorption of water from the hydrogel by the acid. Instead of soaking the hydrogel in acid the same result may be secured by washing the hydrogel with strong acid. In this case the acid may be progressively increased in strength from about 45° Bé. to about 60° Bé. and then progressively decreased in strength down to about 45° Bé. If sulphuric acid of lower strength than 60° Bé. is employed for the acid wash, the hydrogel should preferably be at a higher temperature than 5° to 30° C. The duration of the acid wash depends upon the rate at which the acid is supplied to the hydrogel and the strength of the acid, but should be between one and two hours.

It is not essential that the hydrogel be washed with sulphuric acid. Any strong acid will do, such as nitric or hydrochloric acids. Sulphuric acid is preferred because of its cheapness.

The acid is allowed to drain from the hydrogel for a period of from two to four hours before the final washing takes place. The hydrogel is then washed with hot water at a temperature of about 70° C. for twenty to thirty-six hours. As before, the lower the temperature of wash water, the longer the washing should be prolonged. The hydrogel is next washed with cold water at a temperature of from 5° to 30° C. for about four hours.

The hydrogel must now be dehydrated, and for this purpose a satisfactory method is to dry the hydrogel in a stream of air at progressively increasing temperatures of 80° C. to 120° C. for seven or eight hours. The gel may now be further dried in a vacuum of about twenty-five inches of mercury for about the same time and at about the same temperatures. Other known methods of drying hydrogel may be substituted if desired.

The purpose of the acid wash of the present invention is to purify the hydrogel, thus making it possible to obtain a pure gel of the best quality from raw materials containing the ordinary impurities. Besides dissolving some water-insoluble impurities, the presence of the acid enables the complete removal of soluble electrolytes such as sodium sulfate to be more easily effected. Although sodium sulfate is soluble in water, its complete removal by washing with water alone is somewhat difficult.

It has been found that the stability of the density of gels on repeated activation is affected by their purity or, in other words, by the completeness of the removal of impurities. Gels made according to the above process increase but very slightly in density even when activated at temperatures as high as 870° C. In other words, one advantage of gels prepared according to the method of the present invention is that they may be heated to high temperatures during activation without material change of density.

The apparent density of 200 mesh pulverized gel prepared according to the method of the present invention is from 0.50 to 0.65 after activation at 540° C. If this gel is now activated at 870° C., it will have a density of from 0.55 to 0.70.

One gram of silica gel prepared according to the present invention has a total internal volume of about 0.50 cc. In other words, if we completely fill the pores in silica gel with water, the amount of water taken up will be approximately 50% of the initial weight of the gel. A sufficient percentage of the total internal volume in silica gel is made up of such small pores that the gel will adsorb water vapor to such an extent that it will contain at least 21% of its own weight of water when in equilibrium with water vapor at a temperature of 30° C. and a partial pressure of substantially 22 mm. of mercury, and if the adsorption takes place in the total absence of permanent gases, such as air, the water content may be as high as 40%.

The concentrations of the acid to be employed, the temperatures of the wash water, and other factors stated in this specification, are not to be construed as limiting the invention to these specific values. They are given merely as specific examples of suitable concentrations, temperatures, times of washing, etc. It will be obvious to anyone skilled in the art that these factors may be varied within comparatively wide limits and a satisfactory product may still be obtained.

The invention is not limited in its application to silica gel, but may be used also to purify hydrogels of similar nature, such as hydrogels of oxides of tin, tungsten or titanium, either singly or in combination with each other, or hydrogels of one or more of the above oxides with silica. It also includes treating hydrogels that may be made in other ways than described herein.

Although I have described my invention in considerable detail, it is to be understood that it is not limited thereto, but includes all changes and modifications which come within the scope of the appended claims.

The term "treating" as used in the claims is intended to cover either soaking the hydrogel with acid, or washing the hydrogel with acid, or contacting the hydrogel with acid for a sufficient length of time to enable the acid to effect its action thereon.

Having thus described the invention, what is claimed as new and desired to be secured by Letters Patent is:

1. In a process of purifying a hydrogel, the step of treating the hydrogel with strong acid.

2. In a process of purifying a hydrogel, the step of treating the hydrogel with sulfuric acid.

3. In a process of purifying a hydrogel, the step of treating the hydrogel with sulfuric acid having a specific gravity of about 60° Bé.

4. In a process of purifying a hydrogel, the steps of washing the hydrogel, treating with strong acid, and again washing.

5. In a process of purifying a hydrogel, the steps of washing the hydrogel with hot water, treating with strong acid, and again washing with hot water.

6. In a process of purifying a hydrogel, the steps of washing the hydrogel with hot water, treating with sulfuric acid having a specific gravity of about 60° Bé., and again washing with hot water.

7. In a process of purifying a hydrogel, the steps of washing the hydrogel with hot water, washing with acid of progressively increasing strength and then progressively decreasing strength, draining the acid from the hydrogel, and again washing the hydrogel with hot water.

8. In a process of purifying a hydrogel, the steps of washing the hydrogel with hot water, washing with sulfuric acid, the strength of the acid wash being progressively increased from about 45° Bé. to about 60° Bé. and then progressively decreased to about 45° Bé., draining the acid from the hydrogel, and again washing the hydrogel with hot water.

9. The method of making silica gel which consists in mixing with thorough stirring solutions of a soluble silicate and an acid of such concentrations and amounts that the mixture will set to a hydrogel on standing, allowing the mixture to set, washing the hydrogel with water, treating with strong acid, again washing, and then removing most of the water.

10. The method of making silica gel which consists in mixing with thorough stirring solutions of a soluble silicate and an acid of such concentrations and amounts that the mixture will set to a hydrogel on standing, allowing the mixture to set, washing the hydrogel with hot water, treating with sulfuric acid, again washing with hot water, and then removing most of the water.

11. The method of making silica gel which consists in mixing with thorough stirring solutions of a soluble silicate and an acid of such concentrations and amounts that the mixture will set to a hydrogel on standing, allowing the mixture to set, washing the hydrogel with hot water, washing with sulfuric acid, the strength of the acid wash being progressively increased from about 45° Bé. to about 60° Bé. and then progressively decreased to about 45° Bé., draining the acid from the hydrogel, again washing with hot water, and removing most of the water.

12. A gel having a sufficient number of pores of such size that it will adsorb water vapor to such an extent as to contain at least 21% of its own weight of water when in equilibrium with water vapor at a partial pressure of substantially 22 mm. of mercury and a temperature of 30° C., and having an apparent density ranging from 0.55 to 0.70 after activation at 870° C.

In testimony whereof I hereunto affix my signature.

ERNEST B. MILLER.